United States Patent
Balb et al.

(10) Patent No.: US 7,869,422 B2
(45) Date of Patent: Jan. 11, 2011

(54) RECEIVING DATA COMPRISING SYNCHRONIZATION INFORMATION

(75) Inventors: Markus Balb, Unterhaching (DE); Ivan Kelava, München (DE); Burkart Schneiderheinze, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 238 days.

(21) Appl. No.: 11/575,373

(22) PCT Filed: Sep. 12, 2005

(86) PCT No.: PCT/EP2005/009785

§ 371 (c)(1),
(2), (4) Date: Jun. 17, 2008

(87) PCT Pub. No.: WO2006/029791

PCT Pub. Date: Mar. 23, 2006

(65) Prior Publication Data

US 2008/0259965 A1   Oct. 23, 2008

Related U.S. Application Data

(60) Provisional application No. 60/610,017, filed on Sep. 15, 2004.

(51) Int. Cl.
*H04J 3/06* (2006.01)

(52) U.S. Cl. .................... 370/350; 370/349
(58) Field of Classification Search ............. 370/350, 370/395.62, 503, 510, 507, 511, 512, 61, 370/520, 395.61, 349

See application file for complete search history.

(56) References Cited

U.S. PATENT DOCUMENTS

| | | | | |
|---|---|---|---|---|
| 5,621,772 A | * | 4/1997 | Maturi et al. | 375/366 |
| 5,822,328 A | | 10/1998 | Derby et al. | |
| 5,907,566 A | * | 5/1999 | Benson et al. | 714/798 |
| 6,134,233 A | | 10/2000 | Kay | |
| 2003/0190922 A1 | | 10/2003 | Dalvi et al. | |

OTHER PUBLICATIONS

IEEE Standard 802.3ah-2004, "61.3.3.5 Sync Detection," Amendment to IEEE Standard 802.3, XP-002357123, pp. 360-368, (2004).

* cited by examiner

*Primary Examiner*—Brenda Pham
(74) *Attorney, Agent, or Firm*—SpryIP, LLC

(57) ABSTRACT

A method receives data including synchronization information. The method includes obtaining a synchronization for receiving the data based on the synchronization information. The method includes generating, during receiving of the data, maintenance information indicative of whether the synchronization is being maintained based on the synchronization information. The method includes continuing, upon loss of the synchronization, to generate the maintenance information based on the synchronization.

20 Claims, 3 Drawing Sheets

US 7,869,422 B2

RECEIVING DATA COMPRISING SYNCHRONIZATION INFORMATION

CROSS REFERENCE TO RELATED APPLICATION

This Utility Patent Application claims the benefit of the filing date of U.S. Provisional Application No. 60/610,017, filed Sep. 15, 2004, and International Application No. PCT/EP2005/009785, filed Sep. 12, 2005, both of which are herein incorporated by reference.

BACKGROUND

Certain transmission methods and apparatuses receive data comprising synchronization information, such as data including a continuous stream comprising data units and synchronization units. Example data transmission systems perform a conversion from packet-based data into a constant or continuous data stream in transmit direction and vice versa in receive direction, such as described in the IEEE 802.3ah Standard of 2004.

SUMMARY

One embodiment provides a method of receiving data including synchronization information. The method includes obtaining a synchronization for receiving the data based on the synchronization information. The method includes generating, during receiving of the data, maintenance information indicative of whether the synchronization is being maintained based on the synchronization information. The method includes continuing, upon loss of the synchronization, to generate the maintenance information based on the synchronization.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
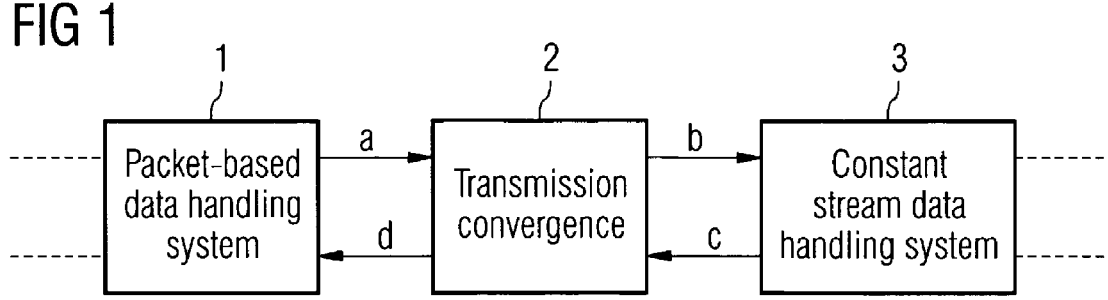
FIG. 1 is a block diagram of a data transmission system in which embodiments may be applied.

A data transmission system is schematically illustrated in FIG. 1. Here, packet-based data a is transmitted from a packet-based data handling system 1 like an Ethernet-based system to a transmission convergence (TC) layer 2. This TC-layer may be a TC-layer as defined in the above-referenced IEEE 802.3ah Standard. In the TC-layer, the packet-based data a is converted into a continuous data stream b and further transmitted to a continuous stream data handling system 3. Continuous stream data handling system 3 may comprise a copper line over which the continuous data stream b may be sent according to an digital subscriber line (XDSL) standard and corresponding mechanism for encoding/decoding the data stream for transmission over the copper line, corresponding to the physical medium attachment physical medium dependent (PMA/PMD)-layer according to the IEEE standard. In the TC layer 2, synchronization information as described later with reference to FIG. 2 is inserted into continuous data stream b.

On the other hand, a continuous data stream c is received by the TC-layer 2 from the continuous stream data handling system 3 and converted into packet-based data d to be forwarded to the packet-based data handling system 1. Like the continuous data stream b, the continuous data stream c contains synchronization information which is used by the TC-layer 2 for synchronization purposes and which is extracted when forming the packet-based data d. Embodiments focus in particular on this synchronization of the continuous data stream c received by the TC-layer 2.

FIG. 1 illustrates certain parts of the transmission system which are relevant to the embodiments described below. As indicated with dashed lines in FIG. 1, further components may be present, in particular, a further transmission system may be connected to the continuous stream data handling system 3 sending the continuous data stream c and receiving the continuous data stream b. Moreover, physical components like line drivers, encoders etc. which are well-known in the art and which do not contribute to the understanding of described embodiments are not described in this specification. As a matter of course, these elements may be present in transmission systems.

Figure 2:
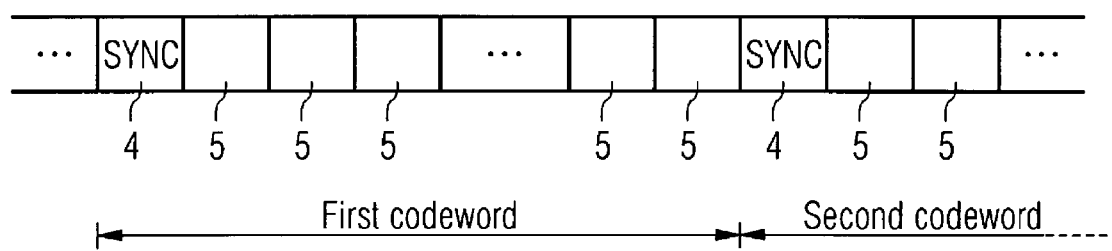
FIG. 2 illustrates the structure of continuous data streams b and c of FIG. 1.

An example format of the continuous data stream b or c is illustrated in FIG. 2. The data stream illustrated in FIG. 2 comprises codewords, In FIG. 2, a first codeword is illustrated completely together with the beginning of a second codeword. Each codeword starts with a synchronization unit 4, followed by a predetermined number of data units 5. In the above-referenced IEEE 802.3ah Standard, both the synchronization units 4 and the data units 5 are octets (8 Bit values), the synchronization units 4 having either the hexadecimal value of 0F or F0, and the data units 5 having either values representing payload data, idle data, or information designating, for example, e.g., a start or an end of a transmitted frame.

According to the above-referenced IEEE 802.3ah Standard in the transmission convergence layer 2 of FIG. 1 two state machines are used for receiving continuous data stream c, namely a first state machine for obtaining a synchronization and a second state machine for the actual receiving of data. An example of the first state machine defined in the above-referenced standard illustrated in FIG. 3. After start 6, the first state machine is set to a state 7 named "LOOKING" in which state a synchronization is to be obtained. In this state, a variable TC_synchronized is set to FALSE to indicate that no synchronization has been obtained yet. As soon as a synchronization is obtained or achieved, the state machine changes into a state "SYNC", designated with reference numeral 8. For instance, a synchronization may be achieved if a predetermined number of codewords as illustrated in FIG. 2 with synchronization units only at the correct positions have been detected.

In state 8, the variable TC_synchronized is set to TRUE to indicate that synchronization has been obtained. Furthermore, a counter variable n is set to 0. When the variable TC_synchronized is set to TRUE, processing of received data may start.

As explained later, during receiving of data it is checked whether the synchronization units 4 of FIG. 2 are received at the correct positions in the continuous data stream c. If, at a position where a synchronization unit 4 is expected, no synchronization unit is received, a variable "MissedSync" is set to TRUE, and a variable "ExpectedSync" is set to FALSE. On the other hand, if a synchronization unit 4 is received at the expected position, the variable MissedSync is set to FALSE, and the variable ExpectedSync is set to TRUE.

Figure 3:
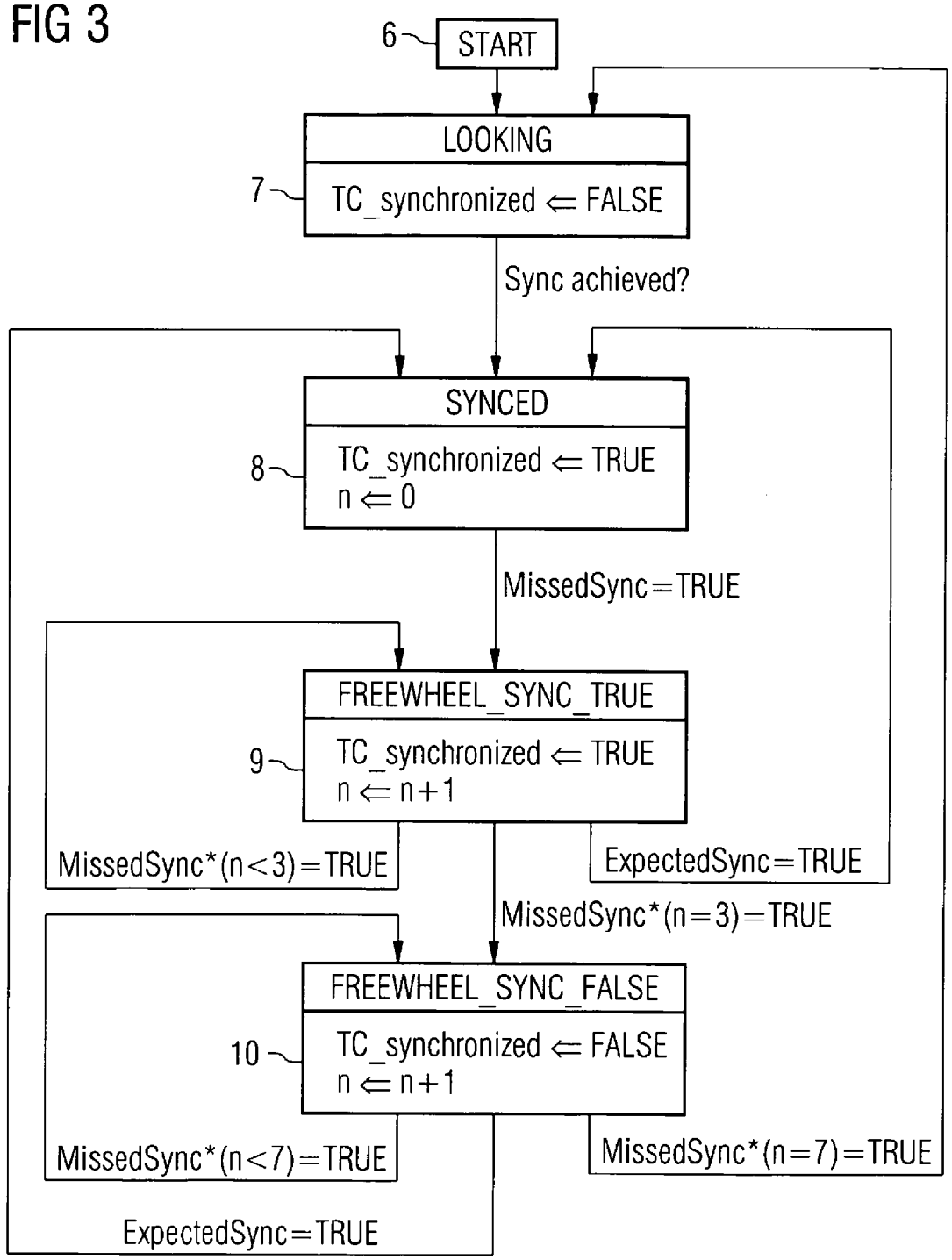
FIG. 3 illustrates a block diagram of a state machine for obtaining a synchronization.

If the variable MissedSync is set to TRUE, the first state machine of FIG. 3 changes to state 9 named "FREEWHEEL_SYNC_TRUE". In this state, the variable TC_synchronized is still set to TRUE, and the counter variable n is incremented by 1. If MissedSync again is set to TRUE and n is smaller than 3, the state 9 is entered again, meaning that up to three consecutive occurrences (n=0, 1, 2) of a unit other than a synchronization unit at a position where a synchronization unit is expected are tolerated. If, in state 9, the variable ExpectedSync is set to TRUE, the first state machine of FIG. 3 reverts to state 8. On the other hand, if the variable MissedSync is set to TRUE for the forth time (n=3), the first state machine enters state 10 named "FREEWHEEL_SYNC_FALSE", wherein the variable TC_synchronized is set to FALSE and the counter variable n is further incremented by 1. As long as n is smaller than 7, upon further occurrences of MissedSync=TRUE state 10 is entered again leading to a further incrementation of n. If, on the other hand, in state 10 the variable ExpectedSync is set to TRUE, the state machine changes to state 8 indicating that synchronization is present again. If MissedSync is set to TRUE for the eighth time (n=7), the first state machine goes to state 7 indicating that synchronization has been completely lost and has to be obtained again from the start. As a matter of course, after the evaluation in the first state machine both MissedSync and ExpectedSync have to be reset to FALSE again.

Figure 4:
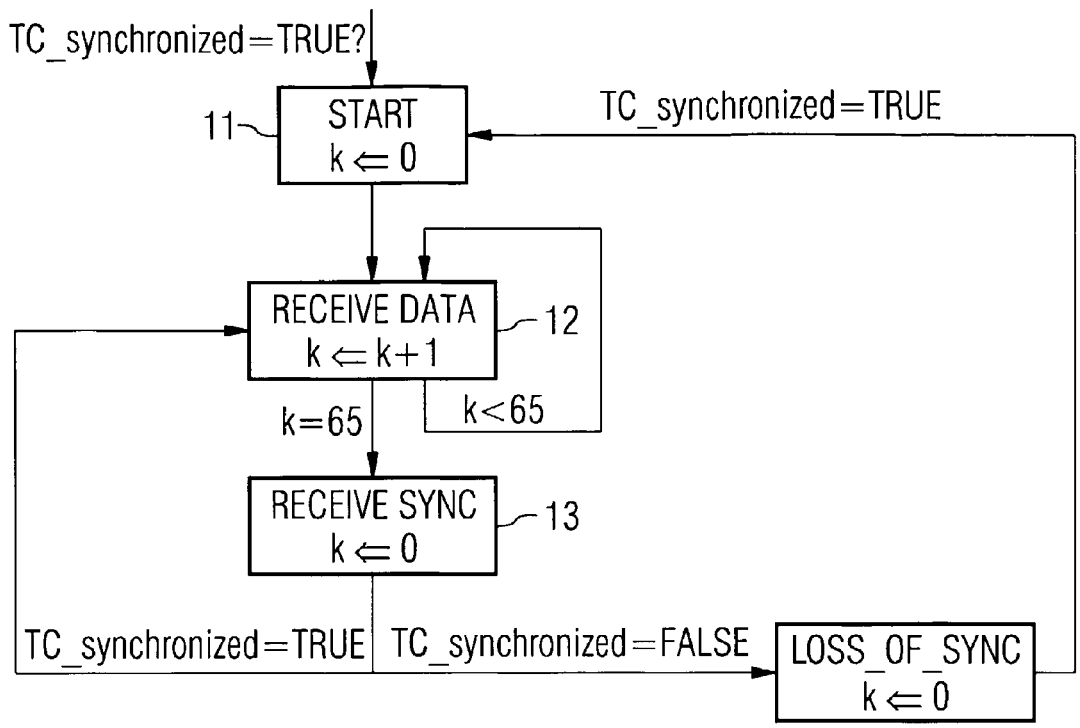
FIG. 4 illustrates a block diagram of a state machine for receiving data.

A simplified version of an example of the second state machine is illustrated in FIG. 4. When the variable TC_synchronized is set to TRUE, in state 11 of the second state machine the synchronization unit 4 (see FIG. 2) of a first codeword is received, and a counter variable k is set to 0. After that, in state 12, in case of the IEEE 802.3ah Standard 64 data units 5 are received and data is received and processed (e.g., converted to packet-based data). During this receiving of data, k is counting from 1 to 64 (i.e., k is incremented each time state 12 is entered) e.g., each time a data unit is received where state 12 is entered again and again as long as k<65. When k reaches 65, state 13 is entered, wherein the synchronization unit 4 of the next codeword is received and k is set to 0. In this step, the variables MissedSync and ExpectedSync described with reference to the first state machine of FIG. 3 are set accordingly, i.e., if in step 13 an actual synchronization unit with the correct value is received, ExpectedSync is set to TRUE and MissedSync is set to FALSE, otherwise ExpectedSync is set to FALSE and MissedSync is set to TRUE (of course, if the variables have been set to FALSE beforehand, they do not have to be set to FALSE again). After setting these variables, the variable TC_synchronized is checked. If this variable is TRUE, the second state machine of FIG. 4 goes to state 12, if this variable is FALSE, the second state machine goes to state 15 named "LOSS_OF_SYNC". In this state, k is maintained at 0 independent of incoming data packets. This state is only left when variable TC_synchronized is set to TRUE, in which case the second state machine of FIG. 4 goes to state 11.

The actual second state machine used according to the above-cited IEEE 802.3ah Standard is more elaborate than the simplified version illustrated in FIG. 4 and in particular involves receiving of data units of different kinds, for example data units indicating an idle state or data units indicating the start or end of a frame. However, these additional features are not needed for the understanding described embodiment and are therefore not depicted in FIG. 4.

With the example first and second state machines illustrated in FIGS. 3 and 4, the following problem may occur: If the first state machine is in state 10, TC_synchronized is set to FALSE having the consequence that the second state machine will assume state 15. However, in state 15, the variables MissedSync and ExpectedSync are not generated or set to TRUE anymore. Therefore, the first state machine will be locked in state 10 and the second state machine will be locked in state 15, since also TC_synchronized will remain FALSE. The only possibility in this situation, which is called a deadlock, is a complete reset of the state machines.

Embodiments provide a method and an apparatus for receiving data where such a deadlock may be avoided even if synchronization is lost for a longer period of time and normal operation may be resumed without a complete reset. In particular example embodiments, a method and an apparatus may be implemented as an improvement of the IEEE 802.3ah Standard.

One embodiment of a method for receiving data, wherein the data comprises synchronization information, comprises obtaining a synchronization for receiving the data on the basis of the synchronization information. The method embodiment comprises generating, during receiving of the data, maintenance information on the basis of the synchronization information indicative of whether the synchronization is being maintained. The method embodiment comprise continuing, upon loss of the synchronization, the generation of the maintenance information on the basis of the synchronization. A corresponding apparatus embodiment can perform this method. With the method and the apparatus embodiments, a deadlock may be avoided.

In other words, if synchronization is lost, the information regarding the previously obtained synchronization is not discarded immediately, but is continued to be used for generating the maintenance information until a new synchronization is found.

In embodiments the information regarding the previously obtained synchronization may also be used for purposes other than the generation of the maintenance information after loss of synchronization, which may be applied to processing of data in general.

In this way, in one embodiment, maintenance information is continued to be generated and may be used for operating an apparatus for receiving data, thus preventing a deadlock.

In one embodiment, the data is a continuous stream of units, for example octets, where the units comprise data units and synchronization units representing the synchronization information. In particular, the continuous data stream may be formed according to the IEEE 802.3ah Standard (i.e., a succession of codewords) each codeword starting with a synchronization unit followed by a predetermined number of data units.

In this case, for generating the maintenance information, in one embodiment, it may be checked whether a synchronization unit is received at a position expected according to the synchronization obtained.

For implementing a method embodiment, one or more state machines may be used. In particular, a first state machine for obtaining the synchronization may be used, the state of the first state machine being indicative of whether synchronization has been obtained. The first state machine may be a state machine as described in the IEEE 802.3ah Standard.

In one embodiment, a corresponding second state machine may be used for receiving data, the second state machine having a state which is assumed when the first state machine is in a state indicating that synchronization has been lost. In this state of the second state machine, in one embodiment the continued generation of the maintenance information is performed, so that the first state machine may leave the state indicative of a loss of synchronization depending on the maintenance information, thus preventing a deadlock.

While embodiments, can be employed within the framework of the IEEE 802.3ah Standard, embodiments may be useful in other systems where data comprising synchronization information is received or in general where a synchronization is performed.

One embodiment described in the following is implemented as a modification to the transmission convergence layer as described for instance in the already cited IEEE 802.3ah Standard. As a consequence, the features of the transmission system of FIG. 1 and in particular of a transmission convergence layer 2 of FIG. 1 described above with reference to FIGS. 1 through 4, with the exception of the modifications which follow, also apply to embodiments. In order to avoid unnecessary repetition, the description of FIGS. 1 to 4 already given above is not repeated here.

Figure 5:
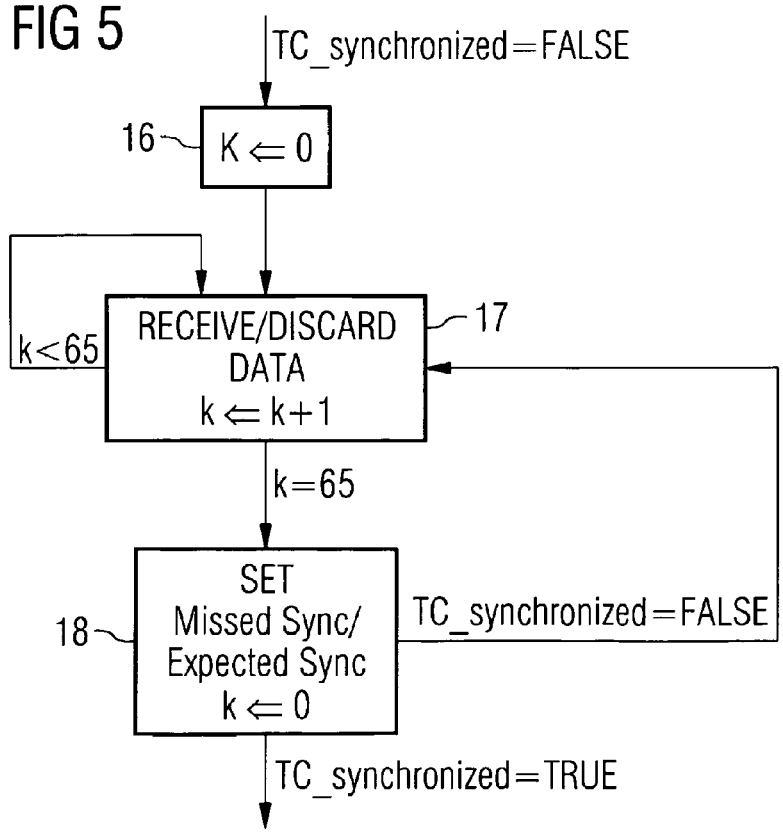
FIG. 5 illustrates a modification of the state machine of FIG. 4 according to one embodiment.

In particular, the transmission convergence layer according to one embodiment of comprises a first state machine for obtaining synchronization like the one illustrated in FIG. 3 and a second state machine for receiving data which is based on the state machine illustrated in FIG. 4. In this embodiment, however, state 15 named "LOSS_OF_SYNC" of the second state machine illustrated in FIG. 4 is replaced by states 16 through 18 as illustrated in FIG. 5. In this embodiment, the rest of the second state machine remains unchanged, wherein again as noted above in an actual implementation this state machine will be more elaborate and will correspond for instance to the one described in the IEEE 802.3ah Standard.

In particular, if, starting from state 13 of FIG. 4, the variable TC_synchronized is set to FALSE, the second state machine goes to state 16 of FIG. 5. Here, the counter variable k is set to 0. State 16 may also be left out since k is already set to 0 in the preceding state 13. Furthermore, from state 16 an immediate transition to state 17 occurs, whereas the loop represented by state 17 as described in the following is only executed when data, (e.g, an octet) is received. After this has been done, state 17 is assumed, where k is incremented by 1 with each incoming unit (data unit 5 or synchronization unit 4) of continuous data stream c illustrated in FIGS. 1 and 2. State 17 is repeatedly assumed as long as k<65. If k is equal to 65, state 18 is assumed. Here, similar to state 13 of FIG. 4, it is checked whether the received unit is a synchronization unit as is to be expected according to the synchronization which has been lost. In case the received unit is in fact a synchronization unit, the variable ExpectedSync is set to TRUE, otherwise, the variable MissedSync is set to TRUE. Since general synchronization has been lost in the case of states 16 to 18, usually MissedSync will be set to TRUE in state 18. Finally, in state 18, the variable k is set to 0, and if TC_synchronized is FALSE, the second state machine goes back to state 17. In case TC_synchronized is TRUE, the second state machine goes to state 11 of FIG. 4.

Note that in contrast to the received data state 12 of FIG. 4, in state 17 the received units are, in one embodiment, not further processed since synchronization is lost and consequently the received data would possibly be erroneous.

As can be easily seen, the deadlock situation which may occur in a conventional transmission system cannot occur with the modification according to the embodiment as described above. In particular, if synchronization has been lost, (e.g, the first state machine is in state 10) in state 18 the variable MissedSync will repeatedly be set to TRUE in case synchronization is still lost, thus incrementing the counter variable n of FIG. 3 until n reaches 7, which causes the first state machine of FIG. 3 to go to state 7 in order to obtain a new synchronization and, when this synchronization has been achieved, to state 8 where the variable TC_synchronized is set to TRUE. When this happens, the second state machine goes to state 11 of FIG. 4, and normal receiving of data may be assumed. In this case, k is set to 0 so that counter k is aligned to the new synchronization.

As a matter of course, when synchronization is lost, a transmitter from which the continuous data stream c is received should be notified accordingly so that no loss of data occurs, but data which is sent after synchronization has been lost is sent again after synchronization is re-established.

In one embodiment, state 15 of FIG. 4, according to the IEEE 802.3ah Standard, may also be entered by reset. In case of the modifications according to embodiments as described above, also in this case the variable MissedSync or ExpectedSync will be set to TRUE repeatedly. In this embodiment, however, since these variables are not evaluated in state 7 of the first state machine of FIG. 3, which is also entered upon a reset, this does not adversely affect the functionality of the system.

Although the above embodiments have been described within the framework of the IEEE 802.3ah Standard, the principle of the embodiments that when synchronization is lost, the previous synchronization is not discarded immediately but used to generate further information (e.g., in the above embodiment the variables MissedSync and ExpectedSync) regarding the maintenance or presence of synchronization until a new synchronization is achieved may be used with any data receiving system using synchronization information.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of receiving data comprising synchronization information as data packets transmitted over a transmission line, the method comprising:
   obtaining a synchronization for receiving the data based on the synchronization information;
   repeatedly generating, during receiving of the data, maintenance information indicative of whether the synchronization is being maintained based on the synchronization information; and
   continuing, upon loss of the synchronization, to repeatedly generate the maintenance information based on the previous synchronization.

2. The method according to claim 1, wherein the data comprises a continuous data stream.

3. The method according to claim 1, wherein the data comprises synchronization units representing the synchronization information, and data units.

4. The method according to claim 3, wherein the generating of the maintenance information comprises:
   checking whether a synchronization unit is received at an expected position within the data, the maintenance information indicating that the synchronization is being maintained if the synchronization unit is received at the expected position and the maintenance information indicating that the synchronization is not being maintained if at the expected position no synchronization unit is received or if a synchronization unit is received not at the expected position.

5. The method according to claim 3, comprising:
   stopping processing of the data units upon loss of the synchronization.

6. The method according to claim 1, wherein the method is performed in a transmission convergence layer.

7. The method according to claim 1, wherein the method is implemented as a modification of the IEEE 802.3ah Standard.

8. The method of claim 1, comprising:
   continuing, upon loss of the synchronization, to repeatedly generate the maintenance information based on the previous synchronization until a new synchronization is obtained.

9. A circuit for receiving data comprising synchronization information, the circuit comprising:
   means for obtaining a synchronization for receiving the data based on the synchronization information;
   means for repeatedly generating, during receiving of the data, maintenance information indicative of whether the synchronization is being maintained based on the synchronization information; and
   means for repeatedly generating, upon loss of the synchronization, the maintenance information based on the previous synchronization.

10. The circuit according to claim 9, comprising:
    at least one state machine for receiving the data.

11. The circuit according to claim 9, comprising:
    a state machine comprising the means for obtaining a synchronization.

12. The circuit according to claim 9, comprising:
    a state machine comprising the means for generating, during receiving of the data, maintenance information.

13. The circuit according to claim 12, wherein the state machine comprises the means for generating, upon loss of the synchronization, the maintenance information.

14. The circuit according to claim 9, comprising:
    a state machine comprising the means for generating, upon loss of the synchronization, the maintenance information.

15. The circuit according to claim 9, wherein the data is a continuous data stream.

16. The circuit according to claim 9, wherein the data comprises synchronization units representing the synchronization information, and data units.

17. The circuit according to claim 16, wherein the means for generating the maintenance information comprises:
    means for checking whether a synchronization unit is received at an expected position within the data, the maintenance information indicating that the synchronization is being maintained if the synchronization unit is received at the expected position and the maintenance information indicating that the synchronization is not being maintained if at the expected position no synchronization unit is received or if a synchronization unit is received not at the expected position.

18. The circuit according to claim 9, comprising:
    means for stopping processing of the data units upon loss of the synchronization.

19. The circuit according to claim 9, wherein the apparatus is implemented to provide at least a part of the functionality of a transmission convergence layer.

20. The circuit according to claim 9, wherein the apparatus is implemented based on the IEEE 802.3ah Standard.

* * * * *